April 8, 1947.  D. J. SIKORRA  2,418,560

MOTOR CONTROL SYSTEM

Filed March 16, 1944

Inventor
D. J. Sikorra
by Didier Journeaux
Attorney

Patented Apr. 8, 1947

2,418,560

UNITED STATES PATENT OFFICE 2,418,560

MOTOR CONTROL SYSTEM

Daniel J. Sikorra, Milwaukee, Wis., assignor to Allis-Chalmers Manufacturing Company, Milwaukee, Wis., a corporation of Delaware Application March 16, 1944, Serial No. 526,753

8 Claims. (Cl. 172—288)

This invention relates in general to improvements in motor control systems, and more particularly to means for automatically varying the resistance of a motor circuit during starting of the motor.

The starting current of electric motors, particularly direct current motors, is frequently limited by inserting resistors in circuit with the motor armature winding and automatically removing the resistors, one after the other, from the circuit while the motor accelerates to its running speed. This operation may be performed by switches of the contactor type which operate in response to the magnitude of the motor back E. M. F. or which are controlled by a relay responsive to the motor current. Such systems, however, require complicated interlocks or delicately adjusted switch operating means. The starting operation may also be controlled by timing means which, however, take no account of the rate of acceleration of the motor and may therefore cause the motor starting current to be either too high or too low. The starting systems of the art also generally fail to operate uniformly for the reason that their operation is affected by the temperature of the operating coils utilized therein.

The above disadvantages may be avoided by controlling the switches for short-circuiting the starting resistors by means of a rotary accelerating relay operable into a plurality of stable positions in response to variations in two oppositely varying conditions of the system such as the motor back E. M. F. and the voltage drop in the starting resistors. The switches for short-circuiting the resistors may then be of a uniform design and the closing coils thereof may be selectively energized at full line voltage, thereby insuring positive operation thereof.

It is therefore an object of the present invention to provide a motor starting system which is differentially responsive to two inversely varying conditions of the system.

Another object of the present invention is to provide a motor starting system operable in response to the motor back E. M. F. and to the voltage drop in the starting resistors.

Another object of the present invention is to provide a motor starting system utilizing rotary means operable into a plurality of stable positions in response to variations of at least one operating condition of the system.

Objects and advantages other than those above set forth will be apparent from a consideration of the following description when read in connection with the accompanying drawing, in which.

Figure 1:
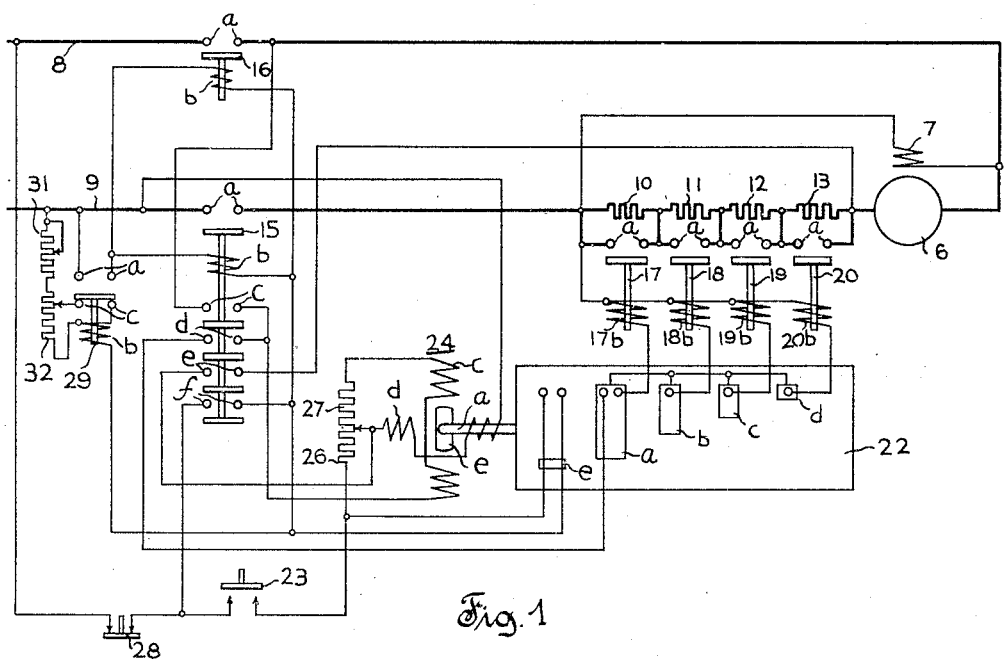
Fig. 1 is a diagram of an embodiment of the present invention consisting of a starting system for a direct current motor utilizing a rotary relay having the windings thereof connected in parallel with the motor armature and with the starting resistors respectively.

Referring more particularly to the drawing by characters of reference, a direct current motor comprising an armature winding 6 and a shunt field winding 7 is to be supplied with current from a supply circuit 8, 9 energized from a suitable direct current generator (not shown). A plurality of resistors 10 to 13 are serially connected with armature winding 6 for limiting the motor current upon connection of the motor with circuit 8, 9 through the main contacts 15a, 16a of a pair of line switches 15, 16. The line switches are provided with operating coils 15b, 16b and switch 15 is also provided with auxiliary contacts 15c to 15f.

Resistors 10 to 13 are controlled by means of a plurality of switches 17 to 20 of the contactor type having pairs of contacts 17a to 20a severally arranged in short-circuiting relation with the different resistors. The closing coils 17b to 20b of the short-circuiting switches may be energized from circuit 8, 9 through contacts 15a, 16a and through a rotary controller generally designated by 22. The controller comprises a plurality of contact segments 22a to 22d of different angular extent conductively connected with each other and severally associated with contact fingers connected with coils 17b to 20b. Segment 22a is further provided with a contact finger connected with one of contacts 15d. Controller 22 is also provided with a segment 22e for bridging contacts 15f and a starting push button switch 23.

Controller 22 is mounted on an insulated extension of the shaft 24a of a rotary relay 24 of the torque motor type. Relay 24 comprises a stator 24b provided with two field windings 24c, 24d. The field windings are preferably distributed over the bore of the stator as diagrammatically illustrated in Figs. 2 and 3 and are overlapping to obtain a uniform action of the windings on the associated rotor 24e. The rotor may be a wound or unwound block of ferromagnetic material or a permanent magnet.

The active conductors of windings 24c, 24d are preferably distributed on the bore of stator 24b according to a sinusoidal law. More specifically, the number of conductors of each winding occupying a unit length of the periphery of the bore is proportional to the sine of the angle defined by radii passing through the unit length considered and through a reference point of the bore. Although the conductors may be strung within the bore of the stator it is generally preferred to insert the conductors occupying each unit length in a separate slot. The stator slots and the periphery of the rotor are preferably skewed with respect to each other to render the action of the field windings on the rotor more uniform.

Figure 2:
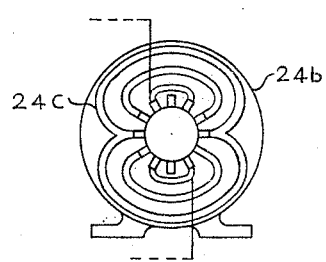
Fig. 2 is an end view of the stator of the rotary relay utilized in Fig. 1 showing the end connections of one of the stator windings.
Figure 3:
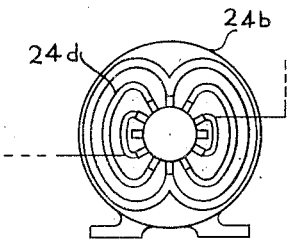
Fig. 3 is an end view of the stator showing the end connections of the other stator winding, and Fig. 4, which is drawn on a larger scale than Figs. 2 and 3, is an end view of the rotor of the relay illustrated in Fig. 1 showing the contact segments of the controller actuated thereby.

The arrangement of winding 24c in the stator slots is indicated in Fig. 2 which shows the end connection of winding 24c only. There are no conductors in the top and bottom slots and the number of conductors increases from slot to slot to reach a maximum at the level of the rotor axis. The end connections are between conductors at the same level to form a winding having a vertical magnetic axis. Winding 24d is similar to winding 24c but is relatively angularly displaced with respect thereto by 90° or by any other suitable angle and may be disposed in the same slots as winding 24c. Winding 24d may be connected across circuit 8, 9 through the lower portion 26 of a resistor having an adjustable tap, starting push button 23 and a stop push button 28, and may be connected instead in parallel with resistors 10 to 13 through contacts 15a and 15e. Winding 24c may be connected in parallel with armature winding 6 through contacts 15c, the upper portion 27 of the adjustable resistor and contacts 15e. Controller 22 is thereby rendered operable into a plurality of stable positions, including a starting position in which only segment 22e is engaged, in response to variations in at least one operating condition of the system. The energization of the closing coils 15b, 16b of switches 15, 16 is controlled by contacts 29a of a marginal relay 29 having the coil thereof energized from circuit 8, 9 through contacts 15f, push button switch 28 and two resistors 31, 32. An adjustable portion of resistor 32 may be short-circuited by contacts 29c when relay 29 is deenergized.

Figure 4:
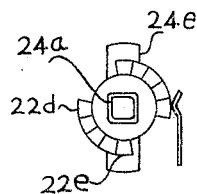

Fig. 1 shows the elements of the system in the position reached thereby after shutdown of motor 6, 7. To initiate operation of the motor, push button switch 23 is closed to cause current to flow from conductor 8 through switch 28, switch 23, resistor 26 and winding 24d to conductor 9. The flow of current through winding 24d produces a magnetic field causing rotor 24e to rotate by substantially 90° to come into alignment with the magnetic axis of the stator, which is then the same as the geometric axis of winding 24d. It will be observed that if rotor 24e is an unmagnetized block of ferromagnetic material the rotor may indifferently rotate clockwise or counterclockwise under the action of winding 24d to thereby reach one or the other of two positions at 180° from each other. As shown in Fig. 4, however, segments 22a to 22e are formed symmetrically with respect to the axis of shaft 24a so that the same connections are effected thereby at two positions differing from each other by 180°.

The position then reached by rotor 24e and controller 22 is the starting position wherein only segment 22e is engaged by the associated contact fingers. A circuit is thereby completed from conductor 8 through switch 28, switch 23, segment 22e, coil 29b, contacts 29c, a portion of resistor 32 and resistor 31 to conductor 9. Relay 29 accordingly operates to open contacts 29c and close contacts 29a. Opening of contacts 29c inserts the entire resistor 32 in series with coil 29b to cause relay 29 to have a higher drop out voltage than any of switches 15 to 20. Closure of contacts 29a completes a circuit from conductor 8 through switch 28, switch 23, segment 22e, coils 15b and 16b and contacts 29a to conductor 9 to cause closure of switches 15, 16. The switches close contacts 15a, 16a thereof to connect armature winding 6 with circuit 8, 9 through resistors 10 to 13 and to connect field winding 7 directly across the line.

Contacts 15f then bypass switch 23 and segment 22e so that the switch may be released by the operator. Closure of contacts 15e completes a circuit from the juncture point of armature winding 6 with resistor 13 through contacts 15e and winding 24d to conductor 9. Winding 24d is thereby connected in parallel with resistors 10 to 13 without opening the circuit of the winding, but resistor 26 is thereby connected in parallel with armature winding 6 through contacts 16a, switch 28, contacts 15f, segment 22e and contacts 15e. Contacts 15e and 15c also complete a circuit from conductor 8 through contacts 16a, contacts 15c, winding 24c, resistor 27, contacts 15e to the juncture point of armature winding 6 with resistor 13, whereby winding 24c is connected in parallel with armature winding 6 through resistor 27.

Upon closure of contacts 15a, 16a substantially the entire voltage of circuit 8, 9 appears across resistors 10 to 13, and winding 24d is energized at substantially the full voltage of circuit 8, 9 while winding 24c is substantially without current. Controller 22 is thus maintained in the starting position previously reached thereby. The flow of current through armature winding 6 and field winding 7 causes the motor to accelerate, whereby the back E. M. F. of armature winding 6 increases gradually from zero and the voltage drop in resistors 10 to 13 decreases gradually from substantially line voltage. The flow of current increases in winding 24c and decreases in winding 24d to the same extent and the magnetic fluxes produced by the windings vary likewise.

Rotor 24e is subjected to the differential action of the inversely varying currents of windings 24c, 24d to pass through a range of stable operating positions. The effect of the current variation in windings 24c, 24d is gradually to shift the magnetic axis of stator 24b from the geometric axis of winding 24d toward the geometric axis of winding 24c. The relation between such shift and the increase in the motor back E. M. F. may be adjusted by displacing the tap of resistor 26, 27. Regardless of such adjustment, each pair of values of the back E. M. F. of armature 6 and of the voltage drop in resistors 10 to 13 results in the flow of currents in a predetermined ratio in windings 24c, 24d and in a predetermined shift of the magnetic axis of stator 24b to move rotor 24e into a corresponding predetermined position. The position of rotor 24e is stable as the rotor remains stationary as long as the ratio of the currents of windings 24c, 24d remains constant and also remains stationary in the event that the windings are deenergized.

During movement of rotor 24e, segment 22e first disengages the associated contacts to stop the flow of current through resistor 26 which then performs no further useful function. Further movement of rotor 24e causes a circuit to be established from conductor 8 through contacts 16a, contacts 15c, contacts 15d, segment 22a, coil 17b and contacts 15a to conductor 9. Switch 17 accordingly closes contacts 17a thereof to short-circuit resistor 10. The flow of current through armature winding 6, which had decreased from its initial value to a value depending on the setting of relay 24, is thereby caused to increase again suddenly to a value depending on the resistance of resistor 10 to cause further acceleration of the motor. It will be observed that short-circuiting of resistor 10 does not affect materially the operation of relay 24. The reason therefor is that the back E. M. F. of armature winding 6 is determined only by the field current and the speed of the motor. The motor back E. M. F. and the voltage drop in the resistors are therefore unaffected by changes in the resistor connections and in the armature current, and the currents of windings 24c, 24d vary only in dependence upon the changes in speed of the motor. The operation of relay 24 is also unaffected by temperature changes, which cause the currents through the relay field windings to vary in the same ratio.

Further acceleration of the motor causes relay 24 to drive controller 22 through the range of operating positions thereof to establish circuits sequentially through the different segments 22b, 22c, 22d to cause sequential operation of switches 18, 19 and 20. Upon closure of switch 20 armature winding 6 is energized at the full voltage of circuit 8, 9 and the starting operation is terminated. Relay 24 then remains in the position shown in which winding 24d is without current and winding 24c is energized at the full voltage of circuit 8, 9 through resistor 27.

When it is desired to stop the motor, switch 28 is opened to interrupt the flow of current through coils 15b, 16b and 20b. Relay 29 returns to the position shown and opens contacts 29a. Switches 15, 16 open to disconnect the motor from circuit 8, 9 and also deenergize the entire control system. Relay 24 is thereby left in the operating position shown from which it must be returned to the starting position to start the motor in the manner above set forth.

The tap of resistor 32 is so adjusted that if, while motor 6, 7 is running, the voltage of circuit 8, 9 drops below the normal value thereof by a predetermined amount, relay 29 returns to the position shown to open contacts 29a, thereby deenergizing coils 15b, 16c to shut down the entire system.

Although but one embodiment of the present invention has been illustrated and described it will be apparent to those skilled in the art that various changes and modifications may be made therein without departing from the spirit of the invention or from the scope of the appended claims.

It is claimed and desired to secure by Letters Patent:

1. A motor control system comprising an electric motor having a winding, resistor means serially connected with said winding, switch means for controlling said resistor means, and a rotary relay for controlling said switch means comprising a field winding connected in parallel with said motor winding, another field winding angularly displaced with respect to the first said field winding and connected in parallel with said resistor means, and a polar magnetic element rotatably disposed in the resultant magnetic field of said field windings, whereby said element is rendered operable by the joint action of said field windings into different stable positions in response to the flow of currents of intensities in different ratios through said field windings.

2. A motor control system comprising an electric motor having a winding, a plurality of resistors serially connected with said winding, a plurality of switches severally controlling said resistors, and a rotary relay comprising relatively angularly displaced field windings connected in parallel with said resistors and in parallel with said motor winding respectively, a polar magnetic element rotatably disposed in the resultant magnetic field of said field windings, whereby said element is rendered operable by the joint action of said field windings into different stable positions in response to the flow of current of intensities in different ratios through said field windings, and a plurality of contact means actuated by said rotary element for causing sequential operation of the different said switches in response to movement of said rotary element through said positions.

3. A motor control system comprising an electric motor having a winding, a plurality of resistors serially connected with said winding, a plurality of switches severally controlling said resistors, and a rotary relay comprising relatively angularly displaced field windings severally energized in response to two different operating conditions of said system, a polar magnetic element rotatably disposed in the resultant magnetic field of said field windings, whereby said element is rendered operable by the joint action of said field windings into different stable positions in response to the flow of current of intensities in different ratios through said field windings, and a plurality of contact means actuated by said rotary element for causing sequential operation of the different said switches in response to movement of said rotary element through said positions.

4. A motor control system comprising an electric motor having a winding, resistor means serially connected with said winding, switch means for controlling said resistor means, a relay for controlling said switch means comprising an element having a starting position and means connected with said system for actuating said element from said starting position into a plurality of stable operating positions in response to variations in at least one operating condition of said system, means for shutting down said motor leaving said element in one of said operating positions, and means for initiating operation of said motor comprising means for returning said element into said starting position.

5. A motor control system comprising a source of electric current, a motor having a winding, resistor means serially connected with said winding, switch means for controlling said resistor means, a relay for controlling said switch means comprising relatively angularly displaced first and second field windings and a rotary member operable by the joint action of said field windings into a plurality of positions including a starting position, second switch means for connecting said motor winding and said resistor means with said source, and means for initiating operation of said motor comprising means for connecting said first field winding with said source to cause said member to move into said starting position, means responsive to movement of said member into said starting position for causing closure of said second switch means, and means responsive to closure of said second switch means for connecting said first field winding in parallel with said resistor means and for connecting said second field winding in parallel with said motor winding.

6. A motor control system comprising a source of electric current, a motor having a winding, resistor means serially connected with said winding, switch means for controlling said resistor means, a relay for controlling said switch means comprising relatively angularly displaced first and second field windings and a rotary member operable by the joint action of said field windings into a plurality of positions including a starting position, and means for initiating operation of said motor comprising means for connecting said first field winding with said source to cause said member to move into said starting position and means responsive to movement of said member into said starting position for connecting said first field winding in parallel with said resistor means and for connecting said second field winding in parallel with said motor winding.

7. A motor control system comprising a source of electric current, a motor having a winding, resistor means serially connected with said winding, switch means for controlling said resistor means, a relay for controlling said switch means comprising first and second windings and a member operable by the joint action of said first and second windings into a plurality of positions including a starting position, and means for initiating operation of said motor comprising means for connecting said first relay winding with said source to cause said member to move into said starting position, and means responsive to movement of said member into said starting position for connecting said first relay winding in parallel with said resistor means and for connecting said second relay winding in parallel with said motor winding.

8. A motor control system comprising a source of electric current, a motor having a winding, resistor means serially connected with said winding, first switch means for controlling said resistor means, an accelerating relay for controlling said switch means comprising first and second windings and a member operable by the joint action of said first and second relay windings into a plurality of positions including a starting position, second switch means for connecting said motor winding and said resistor means with said source, and means for initiating operation of said motor comprising means for connecting said first relay winding with said source to cause said member to move into said starting position, means comprising a marginal relay connected with said source by movement of said member into said starting position for causing closure of said second switch means, and means responsive to closure of said second switch means for connecting said marginal relay with said source independently of the position of said member, for connecting said first accelerating relay winding in parallel with said resistor means and for connecting said second accelerating relay winding in parallel with said motor winding.

DANIEL J. SIKORRA.

REFERENCES CITED

The following references are of record in the file of this patent:

UNITED STATES PATENTS

| Number | Name | Date |
| --- | --- | --- |
| 653,470 | Cutler | July 10, 1900 |
| 850,165 | Knapp et al. | Apr. 16, 1907 |
| 1,306,548 | McLain et al. | June 10, 1919 |
| 1,311,754 | Carichoff | July 29, 1919 |
| 554,230 | Berg | Feb. 11, 1896 |
| 834,010 | Larson | Oct. 23, 1906 |
| 1,030,617 | Sill | June 25, 1912 |
| 1,380,941 | Axtell | June 7, 1921 |